United States Patent
Simhon et al.

(10) Patent No.: US 9,071,510 B2
(45) Date of Patent: Jun. 30, 2015

(54) DETERMINING ROOT CAUSES OF NETWORK ISSUES

(71) Applicant: HEWLETT-PACKARD DEVELOPMENT COMPANY, L.P., Fort Collins, CO (US)

(72) Inventors: Yonatan Ben Simhon, Yehud (IL); Eran Samuni, Yehud (IL); Ira Cohen, Yehud (IL); Ori Adijes, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 13/660,878

(22) Filed: Oct. 25, 2012

(65) Prior Publication Data

US 2014/0122691 A1 May 1, 2014

(51) Int. Cl.
*H04L 12/24* (2006.01)

(52) U.S. Cl.
CPC .......... *H04L 41/0631* (2013.01); *H04L 41/142* (2013.01); *H04L 41/147* (2013.01); *H04L 41/064* (2013.01)

(58) Field of Classification Search
CPC ... H04L 69/40; H04L 41/0631; H04L 41/142; H04L 41/147; H04L 41/064
USPC ..................................... 709/223, 224; 714/14
See application file for complete search history.

(56) References Cited

U.S. PATENT DOCUMENTS

| 7,003,433 | B2 * | 2/2006 | Yemini et al. ................. 702/183 |
| 7,251,584 | B1 | 7/2007 | Perazolo et al. |
| 7,992,040 | B2 | 8/2011 | Agarwal et al. |
| 2004/0255015 | A1 * | 12/2004 | Fitzpatrick et al. .......... 709/223 |
| 2005/0172162 | A1 * | 8/2005 | Takahashi et al. ............... 714/4 |

OTHER PUBLICATIONS

Brauckhoff, D. et al., Anomaly Extraction in Backbone Networks Using Association Rules, 2011, 11 pages.
Das, K., et al., Detecting Anomalous Records in Categorical Datasets, Aug. 12-15, 2007, 10 pages, Carnegie Mellon University, PA, USA.
Kishore, G.D.K. et al., Automated Anomaly and Root Cause Detection in Distributed Systems, Feb. 21, 2012, 6 pages, Dept. of Computer Science & Engineering, India.
Silveira, F. et al., URCA Pulling Out Anomalies by Their Root Causes, Mar. 14-19, 2010, 9 pages, Thompson and UPMC Paris Universitas.

* cited by examiner

*Primary Examiner* — Ario Etienne
*Assistant Examiner* — Sahera Halim
(74) *Attorney, Agent, or Firm* — VanCott, Bagley, Cornwall & McCarthy

(57) ABSTRACT

Determining root causes of network issues includes identifying a previous network issue, comparing a first behavior of network components during the previous network issue with a second behavior of the network components during a current issue of a network, and obtaining a previous user input about a previous root cause of the previous network issue collected while diagnosing the previous issue.

16 Claims, 5 Drawing Sheets

| | Issue | Root Cause | Similarity Score | Ranking | Predicted Root Cause |
|---|---|---|---|---|---|
| 302 | Current Issue | Unknown | Baseline Score: 1.0 | N/A | |
| 304 | Previous Issue #1 | High Memory Usage in Server #1 | Similarity Score: 0.7 | 1 | XX |
| 306 | Previous Issue #2 | Change Event in Database | Similarity Score: 0.4 | 2 | |

DETERMINING ROOT CAUSES OF NETWORK ISSUES

BACKGROUND

Information technology management systems help administrators detect and solve issues faced by various applications running in data centers and other types of networks. Such systems monitor various aspects of the information technology systems, such as application response time, resource utilization, and other issues. The management systems collect the monitoring data and use it to detect the issues.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Often, when a network application has an issue, the symptoms of the issue are detected. However, the root cause of the issue is usually harder to identify. The root cause may be in any network component that is used to run the application, which could be one out of hundreds of network components. For example, an issue in a database may affect the response time of a business transaction which uses that database. A symptom of the issue is the transaction's increased response time, which is experienced by the users of the application. The root cause in this case is the database. However, the application may use several databases and other virtual components. Thus, pinpointing the right network component may be challenging.

In practice, similar network issues have similar root causes and the downstream symptoms tend to reoccur. The principles described herein include a method that predicts the root cause of a current issue based on previous network issues. Such a method may include identifying a previous network issue, comparing a first behavior of network components during the previous network issue with a second behavior of the network components during a current issue of a network, and obtaining a previous user input about a previous root cause of the previous network issue collected while diagnosing the previous issue.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
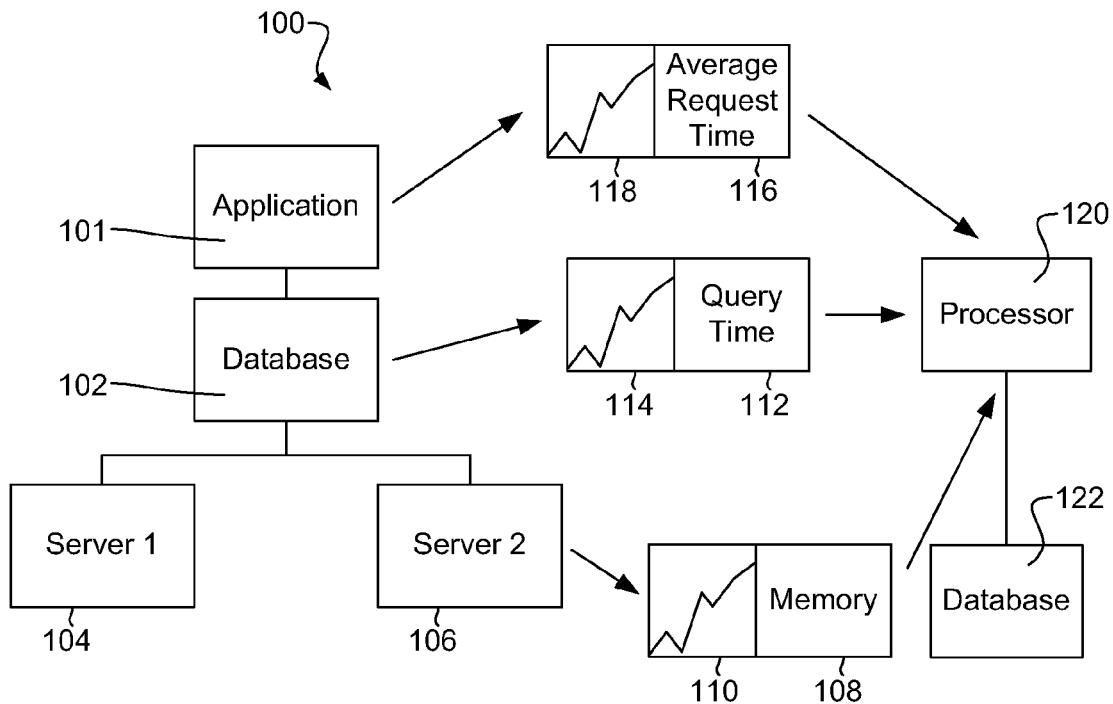
FIG. 1 is a diagram of an example of network components according to principles described herein.

FIG. 1 is a diagram of an example of network components according to principles described herein. In this example, the network (100) has network components which include an application (101), a database (102), a first server (104), and a second server (106). The database (102) and application (101) may be virtual components that are run by the first and second servers (104, 106). In other examples, additional or fewer network components may be used. A non-exhaustive list of network devices may include servers, databases, applications, operating systems, memory, tangible memory storage mediums, processors, printers, web pages, cables, hubs, adapters, switches, routers, desktops, laptops, phones, electronic tablets, nodes, physical machines, virtual machines, firewalls, gateways, scanners, modems, other network components, or combinations thereof.

In the example of FIG. 1, the second server's memory usage (108) is nearly maxed out as schematically depicted in graph (110). As a consequence of the second server's high memory usage (108), the database's query time (112) also increases as schematically depicted in graph (114). As a result of the increased query time (112) the application's average response time (116) as schematically depicted in graph (118) also increases. In this example, the second server's high memory usage (108) is the root cause of the issues in the network (100) while the database's increased query time (112) and the application's increased average response time (116) are symptoms of the network's current issues.

A user may notice the increased average response time (116) of the application (101), but be unaware of the other affects caused by the network's issues. At first glance, the user can assume that the issue is caused by the application (101) and try to improve the application's response time (116) by analyzing, rebooting, or troubleshooting the application (101). In such examples where the user tries to troubleshoot the application (101), the user's efforts will be unfruitful because the increased average response time (116) is not caused by the application (101). Further, if the user's efforts discover the slow query time (112) of the database (102), the user may attempt to correct the database's query time (112) and the application's slow response time (116) by troubleshooting the database (102). Again, since the database's performance is merely a symptom of another issue in the network (100), troubleshooting the database (102) to resolve the issues will also be unfruitful.

Generally, an effective way to reduce the time to resolution of the network's current issue is by identifying the root cause of the issue. A root cause in the servers (104, 106) may exhibit different patterns of behavior in the network (100) than root causes in the database (102). For example, if the root cause is in the database (102), the application's average request time (116) may increase quickly while the application's average request time (116) may increase more slowly when the root cause is due to a server's high memory usage (108). These behavior patterns may have been exhibited during previous network issues where the servers (104, 106) and/or database (102) were the root cause. Thus, by remembering the behavior of the network components during these past issues, a network user can find the root cause of the current issue quicker.

In the example of FIG. 1, a processor (120) in the network (100) may identify that there is an issue. The network components' behavior is sent to the processer (120). In response, the processor (120) analyzes the network conditions, such as the server's low remaining memory (108), database's high query time (112), and the application's high average response time (116). In response to determining that an issue exists, the processor (120) predicts the root cause of the issue by comparing the network components' current behaviors with the network components' previous behaviors from previous network issues. In some examples, the previous network issues are from the same network (100) that has had similar issues in the past. In other examples, the previous issues are from different networks than the network (100) with the current issue. The processor (120) may request information about previous network issues from a second database (122) that stores user's input about the actual root cause of the previous network issues.

After the issue in the network (100) is resolved, the processor (120) requests input from the user as to whether the predicted root cause was accurate. If the user responds that the predicted root cause was correct, the issue's root cause and the behaviors exhibited by the network components during the current network issue are recorded and stored in the database (122) for predicting root causes in future network issues. If the predicted root cause was not accurate, the processor (120) requests input from the user as to what the actual root cause was. In response to further input from the user answering the processor's request, the processor (120) records the accurate root cause with the network component's behavior for further root cause predictions and sends it to the second database (122).

Figure 2:
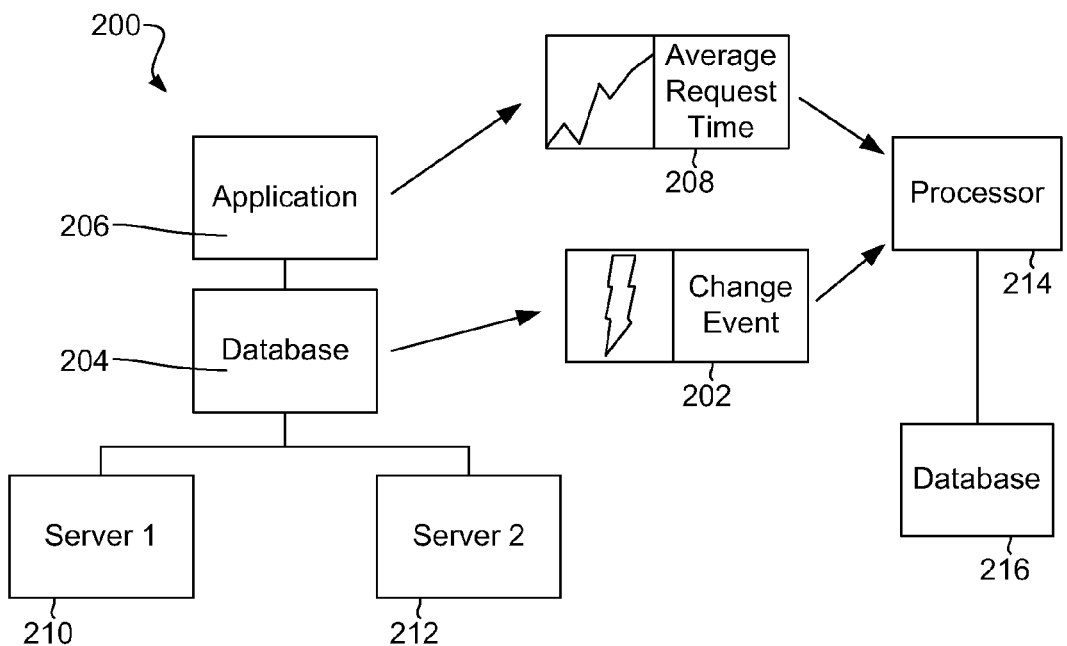
FIG. 2 is a diagram of an example of network components according to principles described herein.

FIG. 2 is a diagram of an example of network components according to principles described herein. In this example, the network (200) has a current issue with a root cause that is different than the root cause of the issue described in the example of FIG. 1. Unlike the root cause in the example of FIG. 1, the root cause in the example of FIG. 2 is an event change (202), such as a program update. However, similar to that in the example of FIG. 1, the application (206) in the example of FIG. 2 is exhibiting an increased average response time (208). Thus, both examples share a common symptom of an issue even though the root causes of the issues are different. In this example, a first server (210) and a second server (212) are operating within accepted parameters.

The behaviors of the network components, such as the event change (202), the increased average response time (208), and the accepted operating conditions of the first and second servers (210, 212), may be sent to a processor (214). These behaviors are compared to the previous issues of the network (200) to predict the root cause of the current network issue.

In some examples, the network (200) has a set of network component behaviors that the network (200) automatically sends to the processor (214) whenever an issue is detected for the root cause prediction. In other examples, just the discovered symptoms of the network's issues are sent. In such an example, the processor (214) may request additional information about the behavior of other network components to aid the processor (214) in making the root cause prediction. The behavior information sent to the processor (214) may be real time data. However, information about recent data can be sent to help the processor (214) understand how the symptoms progressed to their current condition. The processor (214) obtains user input about the root cause of previous issues as well as the behavior exhibited by the network components from a second database (216) during those previous issues to make the prediction.

Figures 3, 4:
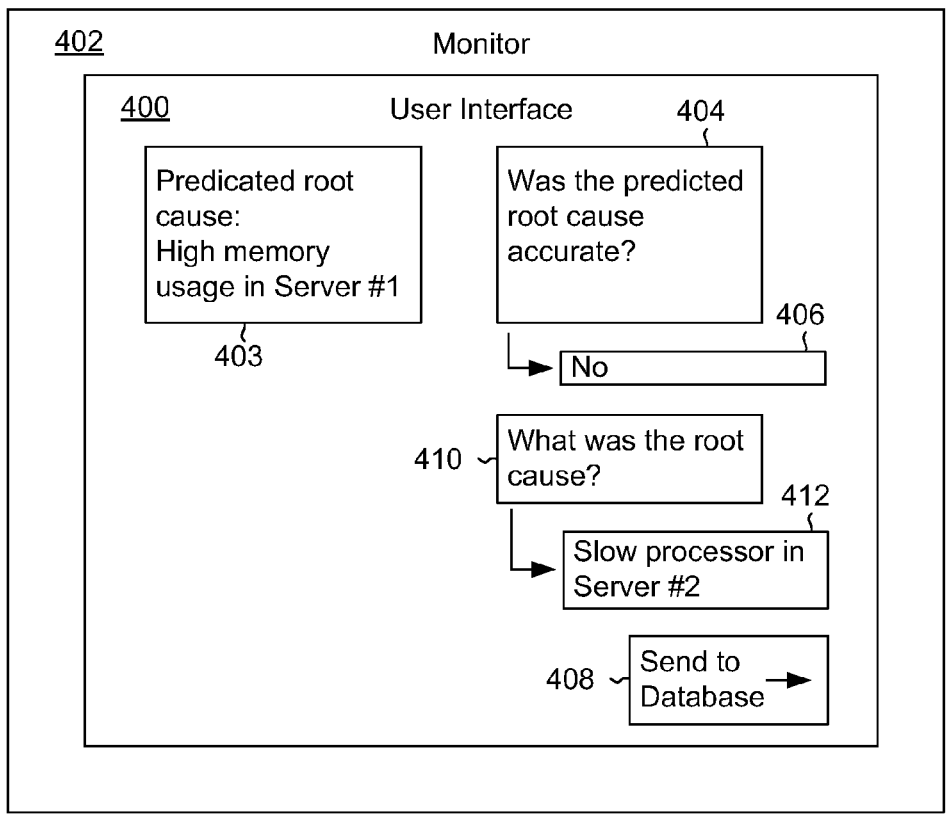
FIG. 3 is a diagram of an example of a ranking chart according to principles described herein.
FIG. 4 is a diagram of an example of a user interface according to principles described herein.

FIG. 3 is a diagram of an example of a ranking chart (300) according to principles described herein. In this example, the ranking chart (300) includes multiple rows (302, 304, 306) and multiple columns (308, 310, 312, 314). The first row (302) is populated with information about the current issue. The second row (304) and the third row (306) are populated with information about previous issues. The first column (308) is populated with information about the root cause of the issues. The root cause may be a combination of components measured through multiple metrics. Thus, one or multiple root causes may be displayed in the first column. The second column (310) is populated with a similarity score measured off of a baseline score formed by the current issue. The third column (312) is populated with rankings based off of the similarity scores, mapping function, mapping scores, user feedback scores, other factors, or combinations thereof. The ranking may be determined with a similarity system that used different types of measurements. The fourth column (314) includes an indication as to which previous issue is predicted to share a common root cause with the current network issue.

In this example, the current issue has an unknown root cause. The first previous network issue has a root cause of a high memory usage in the first server while the second previous network issue had a root cause of a change event in a database. Each of the previous issues are ranked according to how similar they are to the current issue. Each similarity score is measured off of a baseline score generated from the behavior of the network components due to the current network issue. The score may be a deviation value from the baseline score, and the previous network issue with the smallest deviation from the baseline score receives the score most similar to the baseline score. Accordingly, the closer score of the first and second previous issues is ranked first while the other score is ranked second.

The previous issue with the closest score is deemed to have the highest probability of having the same root cause as the current issue. Thus, the first ranked previous network issue is indicated in the fourth column (314) as likely having the same root cause as the current network issue. The system may send the predicated root cause to the user to aid the user in resolving the current network issue.

For calculating the similarity score, a similarity function of S outputs a scalar s that represents the similarity between the current and previous issues. Each issue may be referred to as anomalies $(A_1, A_2)$ and each network component affected by the issues may be referred to as anomaly related components $\{c_1, \ldots, c_m\}$. A mapping function may be expressed as $$S(A_1, A_2) = [s, f, w],$$

where s is the similarity score in the range of [0 . . . 1]. Another relationship that maps between the current network issue (302) and the previous network issues (304, 306) may be expressed as:

$$c_i \in A_{2_c} \begin{cases} f(c_i) \in A_{2_c} & \text{mapping exists} \\ f(c_i) = \text{null} & \text{no mapping exist.} \end{cases}$$

This relationship states how component a of anomaly A is similar to component b of anomaly B.

Further, w may be a matching score function for each of the compared components. Thus, for each $c_i \in A_{i_c}$ and $c_j \in A_{i_c}$ that are matched by f (i.e. $f(c_i)=c_j$), $w(c_i, c_j) \in [0 \ldots 1]$), w may represent the similarity strength between the network issue components. For example, w may express how similar components are to each other. In some examples, the method uses a weight function that returns "1" for each pair of components if no such weights are defined in the similarity mechanism being used.

In some examples, user feedback is also expressed as a function U. The user feedback may be a scalar u in the range of [−1 . . . 1] that is passed into the system by the user and represents the likelihood of a certain anomaly component to be the predicted root cause of the current network issue. Such a function may be expressed as:

$$c_i \in A_c, U(A, c_t) = \begin{cases} \text{value} \in [-1 \ldots 1] & \text{feedback exists} \\ 0 & \text{no feedback exist.} \end{cases}$$

In some examples, a method for predicting the root cause includes looking at a previous network issue with a similar anomaly $A_j$ on all of its detected root causes $c_{ji}$. The user feedback value, $U(A_j, c_{ji})=u_{ji}$, for $A_j$ and $c_{ji}$, may be used to help predict the current root cause. The predicted root cause may be the sum of user feedback values given for the similar components in the similar anomalies multiplied with the similarity score and the matching component's score, where the score ($c_i$) may be expressed as:

$$\sum_{j=1}^{n} u_{j_i} \cdot S(A, A_j) \cdot w(c_i, c_{ji}),$$

where n represents the number of past similar anomalies. Each of the identified root causes and their previous network issues may be sorted by their scores from the highest to lowest to obtain the components which are most likely the root cause of the current anomaly. The system may ask the user for feedback on the current predicted root cause and store the feedback in the database.

While the example of FIG. 3 is described with specific reference to just two previous issues, the analysis may include any number of previous network issues for predicting the current network issue. For example, the system may rank hundreds or thousands of previous network issues to predict the current network issue. Further, the example of FIG. 3 has been described with specific reference to a particular way of scoring the previous network issues, however, any way of scoring the previous network issues may be used that are compatible with the principles described herein. Further, while the example of FIG. 3 has been described with specific reference to a way of predicting the root cause of the current network issue, any mechanism for predicting the root cause that is compatible with the principles described herein may be used.

FIG. 4 is a diagram of an example of a user interface (400) according to principles described herein. In this example, a user interface (400) is displayed in a monitor (402) for use by a user. The user interface (400) includes a prediction field (403) that displays the predicted root cause of the current network issue. In the example of FIG. 4, the predicted root cause is a high memory usage in the first server.

The user interface (400) also include a first question field (404) that asks the user if the predicted root cause was accurate and a first response field (406) where the user may input a response. If the user response indicates that the predicted root cause was accurate, then the user can select a send button (408) to send the user's input to a database that stores the associated root cause with the behaviors exhibited by the network components during the network issue. If the user inputs states that the predicted root cause was not accurate, then a second question field (410) asks the user to indicate the actual root cause. In response to the second question field (410), the user inputs into a second response field (412) the actual root cause. In this example, the user has inputted that the actual root cause is a slow processor in a second server. After filling in the second response field (412) with the accurate root cause, the user selects button (408) to send the accurate root cause to be stored in the database with the network component's behavior with which the actual root cause was associated.

While the above example has been described with specific reference to inputs where the user inputs words into fields, any type of user input that is compatible with the principles described herein may be used. A non-exhaustive list of inputs compatible with the principles described herein include keyboard inputs, voice inputs, machine visual gesture inputs, auditory inputs, touch screen inputs, button inputs, lever inputs, stylus inputs, other forms of inputs, or combinations thereof.

Figure 5:
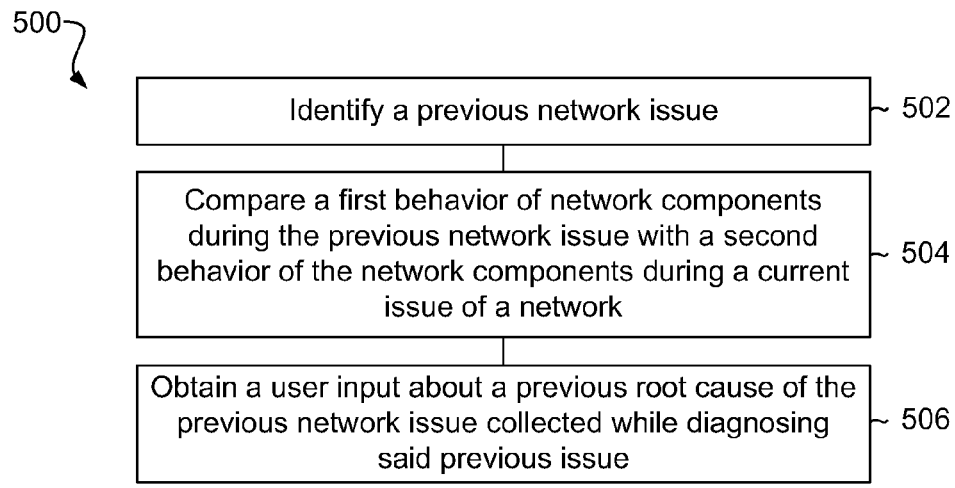
FIG. 5 is a diagram of an example of a method for determining root causes of network issues according to principles described herein.

FIG. 5 is a diagram of an example of a method (500) for determining root causes of network issues according to principles described herein. In this example, the method (500) includes identifying (502) a previous network issue, comparing (504) a first behavior of network components during the previous network issue with a second behavior of the network components during a current issue of a network, and obtaining (506) a user input about a previous root cause of the previous network issue collected while diagnosing the previous issue.

In some examples, the user input is obtained from a database that stores root causes from previous issues and their associated behavior of the network components caused by the root causes. The associated network components' behavior include time delays, processing speeds, available memory, transmission latency, availability data, performance data, data corruption information, temperature data, memory usage, central processing unit usage, other information about the network components' behavior, or combinations thereof.

The user input about the previous network issues may include user input that was requested of the user after the previous issue was resolved or during the investigation of the previous issue. In such examples, the user responses are associated with the symptoms caused by the previous issues' root and stored in the database where the stored information is available for analysis and to make future root cause predictions.

Figure 6:
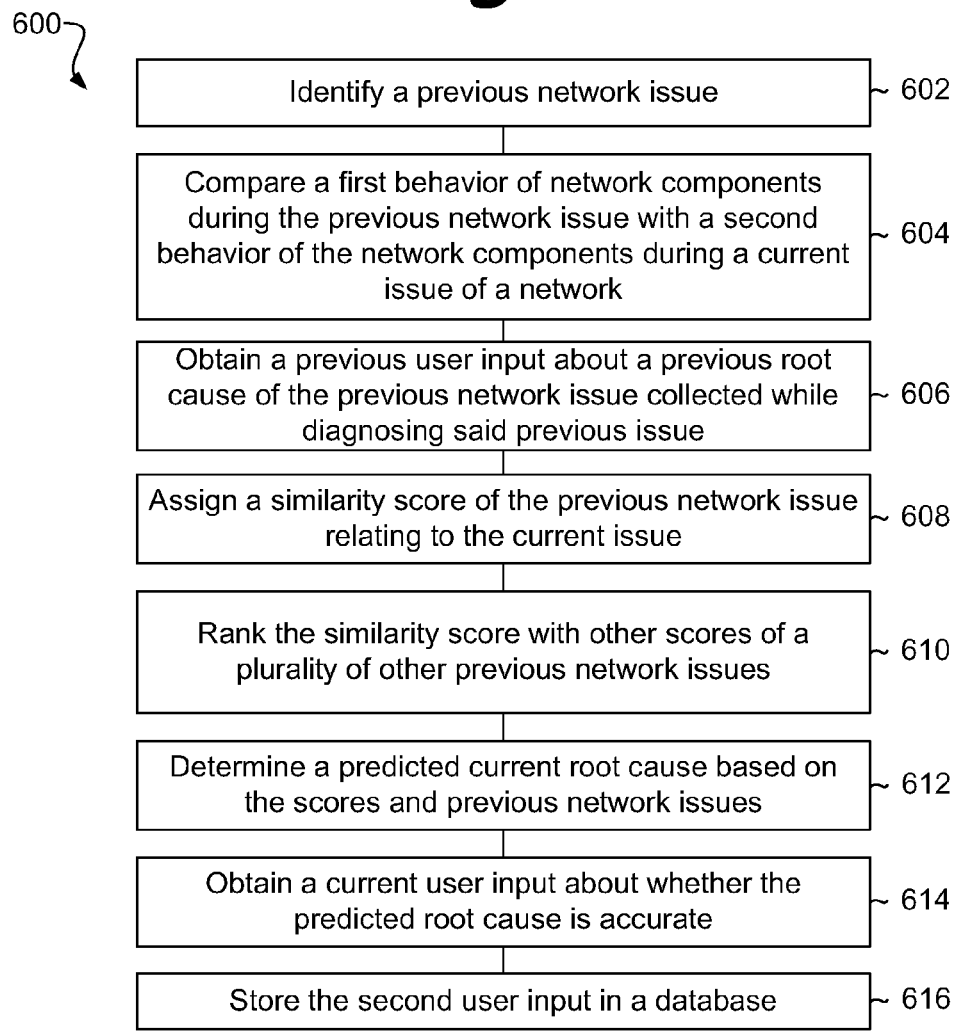
FIG. 6 is a diagram of an example of a method for determining root causes of network issues according to principles described herein.

FIG. 6 is a diagram of an example of a method (600) for determining root causes of network issues according to principles described herein. In this example, the method (600) includes identifying (602) a previous network issue, comparing (604) a first behavior of network components during the previous network issue with a second behavior of the network components during a current issue of a network, and obtaining (606) a user input about a previous root cause of the previous network issue collected while diagnosing the previous issue. The method (600) further includes assigning (608) a similarity score of the previous network issue relating to the current issue, ranking (610) the similarity score with other scores from a plurality of other previous network issues, and determining (612) a predicted current root cause based on the scores and previous network issues. The method (600) also includes obtaining (614) a user input about whether the predicted root cause is accurate, and storing (616) the user input in a database.

In some examples, the user input for current anomalies is stored in the same database as the user input for previous anomalies. As a consequence, the user input for current anomalies becomes available for analysis and comparison to make future root cause predictions of future network issues. The user input for previous anomalies may be requested to make the root cause predictions, or the user input for previous anomalies is sent without solicitation. The method may additionally include requesting the user input for current anomalies from the user. The user input for current anomalies may be requested after the current network issue is resolved.

If the first root cause prediction is not accurate, the user may tell the system that the root cause is inaccurate before the current network issue is resolved. In such an example, the method may include making another root cause prediction. Such additional predicted root causes may be made based on the next highest rankings, on a recalculation of the previous network issues' similarities with the current network issue, other factors, or combinations thereof.

In some examples, the method includes searching through the database for previous network issues that have at least one common symptom with the current network issue. In response to identifying at least one previous issue with at least a common symptom, the method includes identifying each of the symptoms that are similar and also determining how similar each of the common symptoms are in relation to the previous and current network issues. For example, an issue may share the common symptom of a slower processor, however, the current issue may just exhibit a slight decrease in processing speed where as the previous issue may have exhibited a significant decrease in processing power. As a consequence, the previous network issue has a common symptom with the current network issue, and the previous network issue not deemed to be very similar to the current network issue. The method may remove previous network issues that were originally selected for comparison against the current network issue because the comparison found that the previous network issue failed to meet a similarity threshold against the current network issue. Thus, such previous issues are deem to be so different to the current network issue that no further processing resources will be devoted to that particular previous network issue for the purposes of predicting the current network issue's root cause.

In some examples, just certain aspects of the previous network issues and the current network issue are compared to determine their similarities. The comparable aspects include a nature of the issue, an issue's domain, an effect on the network components, a scope of the symptoms, an abnormal behavior pattern exhibited by the network components, other aspects, or combinations thereof.

A processor may calculate the predicted root cause. Alternatively, the method includes displaying a list of the previous network issues with their associated root causes so that a user can view the list and make a root cause prediction.

As the network continues to operate and issues are resolved through the principles described herein, more and more root causes and their associated symptoms are recorded and stored in the database. The increasingly larger amount of data helps the process of predicting the root causes to become more and more accurate over time.

Figure 7:
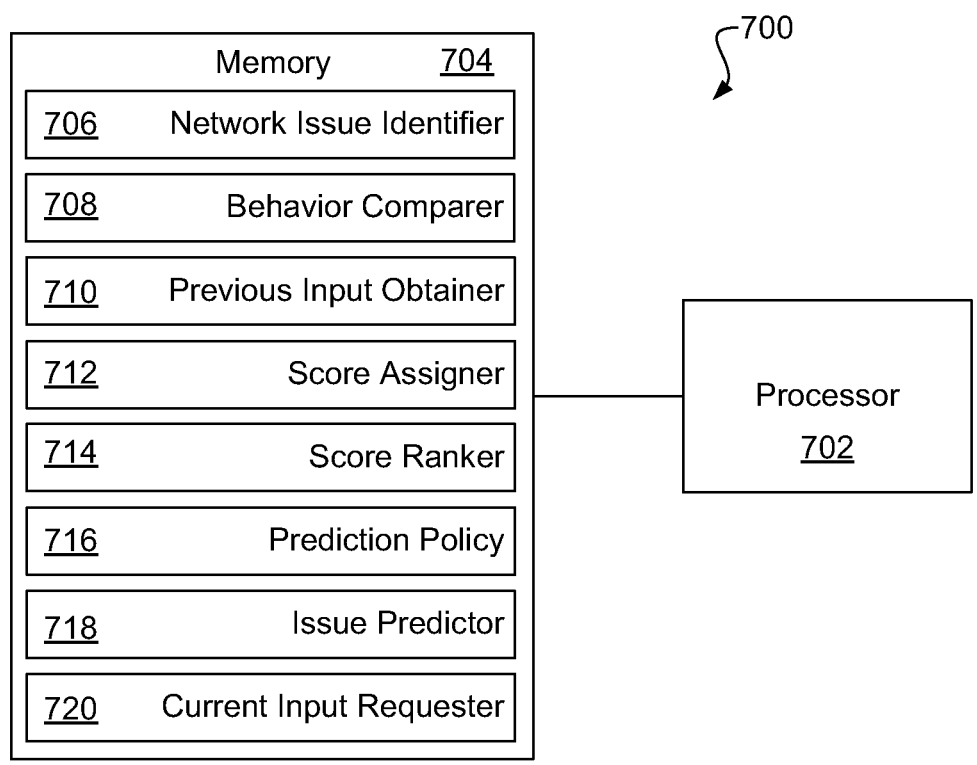
FIG. 7 is a diagram of an example of a determination system according to principles described herein.

FIG. 7 is a diagram of an example of a determination system (700) according to principles described herein. In this example, the determination system (700) has a processor (702) in communication with memory (704). The memory (704) represents generally any memory capable of storing data such as program instructions or data structures used by the determination system. The program instructions shown stored in memory (704) include a network identifier (706), a behavior comparer (708), a previous input obtainer (710), a score assigner (712), a score ranker (714), an issue predictor (718), and a current input requester (720). Also, a data structure in memory (704) include a prediction policy (716). The determination system (700) may be in communication with the network components, databases, other processors, caches, networks, wireless connectors, virtual machines, other devices, or combinations thereof.

The memory (704) is a computer readable storage medium that contains computer readable program code to cause tasks to be executed by the processor (702). The computer readable storage medium may be tangible and/or non-transitory storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The network issue identifier (706) represents program instructions that, when executed, cause the processor (702) to identify when the network is experiencing a current network issue. The network issue identifier (706) may identify an issue in response to user input or in response to sensing abnormal conditions in the network. The behavior comparer (708) represents program instructions that, when executed, cause the processor (702) to compare the network's current behavior exhibited during the current network issue to the previous behavior exhibited during previous network issues. The previous input obtainer (710) represents program instructions that, when executed, cause the processor (702) to obtain previous issues from a database that contains user input about what the root causes and the associated network component behavior was during previous network issues.

Each of the previous network issues may be analyzed with the behavior comparer (708) to determine how similar the previous network issues were to the current network issues. The score assigner (712) represents program instructions that, when executed, cause the processor (702) to assign a similarity score to each previous network issue based on how similar the previous network issue is to the current network issue. The score ranker (714) represents program instructions that, when executed, cause the processor (702) to assign a ranking to the previous network issues that sorts the previous network issues based on their similarity score.

The prediction policy (716) is a data structure in the memory (704) that includes weighted factors for predicting which previous issue has a common root cause with the current network issue. The issue predictor (718) represents program instructions that, when executed, cause the processor (702) to predict that the previous network issue using the rules from the prediction policy (716). The prediction policy (716) may include a rule that indicates that the score having the least deviation from a score baseline, the current network issue's score, is predicted to share a common root cause with the current network issue. In other examples, the issue predictor (718) predicts that another previous network issue shares a common root cause with the current network issue based on other factors according to the prediction policy (716).

The current input requester (720) represents program instructions that, when executed, cause the processor (702) to ask a user whether the predicted root cause is the actual root cause of the current network issue. In examples where the predicted and actual root causes match, the actual root cause and the associated network components' behavior are sent to a database where this information may be obtained at a future time to predict a root cause of a future network issue. In examples where the current network issue is resolved and the predicted root cause was not accurate, the current input requester (720) may cause the processor (704) to request the user to identify the actual root cause of the current issue. In such examples where the user responds by identifying the actual root cause, the actual root cause is also sent to the database to be available for future root cause predictions.

In examples where the current network issue is resolved and the predicted root cause was inaccurate, the user may not know what the actual root cause was. In such examples, the user indicates to the determination system (700) that the actual root cause is unknown, but that the current network issue is resolved. In this example, the determination system (700) may still send the available information to the database. While the database may not be able to correlate the current network issue with an actual root cause, the database may still store information relating to what was not the actual root cause of the current network issue. In this manner, the database may still provide input to future root cause predictions by helping the determination system (700) understand that particular root causes were not responsible for causing certain network behavior and may help improve the future root cause predictions.

In other examples where the predicted root cause was inaccurate and the current network issue remains unresolved, the issue predictor (718) may cause the processor to make another prediction. The subsequent root cause prediction may be the next highest ranked previous network issue in the ranking formed by the score ranker (714). In other examples, the prediction policy (716) may cause other factors to be considered when making subsequent root cause predictions. In other examples, the similarity scores are recalculated and re-ranked. Further, in other examples where the subsequent predictions are made, the determination system (700) may analyze previous network issues that were previously considered when making the earlier root cause predictions. For example, when making the previous root cause predictions, the prediction policy (716) may cause just a subset of the previous network issues to be considered. In such examples, the issue predictor (718) may consider a new subset and/or a larger subset of previous network issues. In some examples, the current input requester (720) seeks feedback on each root cause prediction made. In some examples, just the accurate root cause is recorded and stored, while in alternative examples, both the inaccurate and the accurate root cause predictions are recorded and stored.

Further, the memory (704) may be part of an installation package. In response to installing the installation package, the programmed instructions of the memory (704) may be downloaded from the installation package's source, such as an insertable medium, a server, a remote network location, another location, or combinations thereof. Insertable memory media that are compatible with the principles described herein include DVDs, CDs, flash memory, insertable disks, magnetic disks, other forms of insertable memory, or combinations thereof.

In some examples, the processor (702) and the memory (704) are located within the same physical component, such as a server, or a network component. The memory may be part of the physical component's main memory, caches, registers, non-volatile memory, or elsewhere in the physical component's memory hierarchy. Alternatively, the memory (803) may be in communication with the processor (702) over a network. Further, the data structures, such as the libraries and may be accessed from a remote location over a network connection while the programmed instructions are located locally.

The determination system (700) of FIG. 7 may be part of a general purpose computer. However, in alternative examples, the determination system (700) is part of an application specific integrated circuit.

Figure 8:
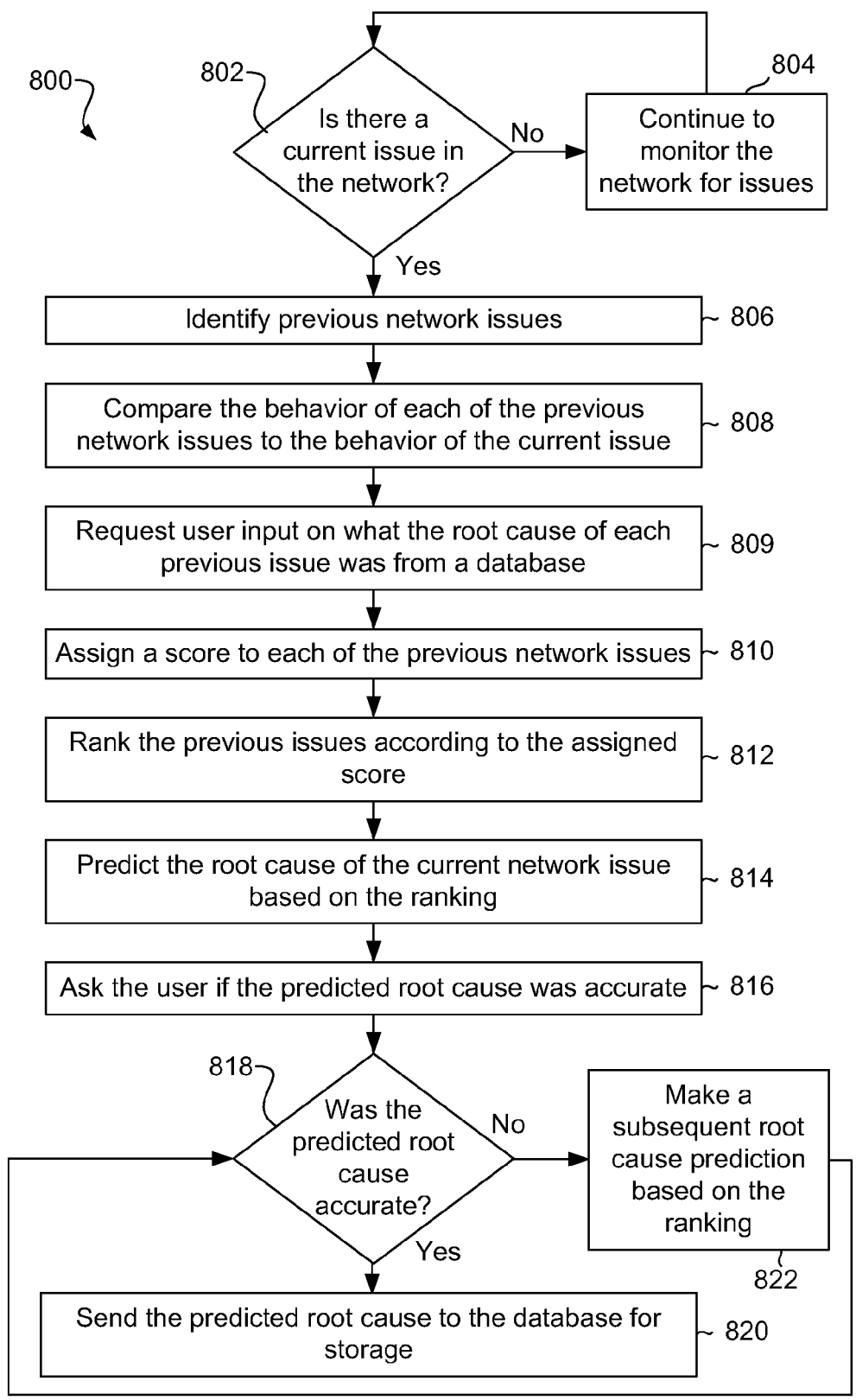
FIG. 8 is a diagram of an example of a flowchart of a process for determining root causes of network issues according to principles described herein.

FIG. 8 is a diagram of an example of a flowchart (800) of a process for determining root causes of network issues according to principles described herein. In this example, the process includes determining (802) whether there is a current issue in the network. If there is no current network issue, then the process continues (804) to monitor the network for issues.

If there is a current network issue, then the process includes identifying (806) previous network issues and comparing (808) the behavior of each of the previous network issues to the behavior of the current network issue. The process includes requesting (809) user input on what the root cause of each previous network issue was from a database. Upon resolution of the previous network issues, a user may have provided the actual root cause of each previous network issue. The process also includes assigning (810) a score to each of the previous network issues and ranking (812) the previous network issues according to the assigned score.

The process includes predicting (814) the root cause of the current network issue based on the rankings. Further, the process includes asking (816) the user if the predicted root cause was accurate. The process may also include determining (818) whether the predicted root cause was accurate. The determination may be made based off of user input. If the root cause was accurate, the process includes sending (820) the predicted root cause to the database for storage. The stored root causes and their associated behaviors are used to make future root cause predictions for future network issues.

If the predicted root cause is not accurate, then the process includes making (822) a subsequent root cause prediction based on the rankings. In examples where subsequent root cause predictions are made, the subsequent predictions are made, in whole or in part, based on other factors.

While the examples above have been described with reference to specific types of network issues, any type of network issue may be addressed with the principles described herein. Further, while the examples above have been described with reference to specific ways of getting user input and specific types of user input, any mechanism for getting any type of user input may be used that is compatible with the principles described herein. Also, while the examples above have been described with reference to specific network architecture and layouts, any network architecture and/or layout that are compatible with the principles described herein may be used.

Also, while specific types of scoring and ranking mechanisms have also been described with specific examples, any mechanism of scoring and/or ranking the previous network issues may be used that is compatible with the principles described herein. Also, while the examples above have been described with reference to specific request wording, any request wording that is compatible with the principles described herein may be used. Further, while the examples above have been described with reference to specific user interfaces and webpage layouts, any user interface and/or webpage layout that is compatible with the principles described herein may be used.

While the examples above have been described with reference to a specific database that stores information about the previous root causes, including the actual root causes of those previous network issues, any mechanism for storing the information may be used that is compatible with the principles described herein. A non-exhaustive list of storage devices that may be used to store the information may include a single database, multiple databases, a storage network, a data center network, virtual databases, physical databases, disks, portable memory devices, flash memory, caches, read only memory, random access memory, volatile memory, non-volatile memory, memristor based memory devices, hard drives, other devices, or combinations thereof.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer program product for determining root causes of network issues, comprising:
 a non-transitory computer readable storage medium, said non-transitory computer readable storage medium comprising computer readable program code embodied therewith, said computer readable program code comprising code that, when executed, causes a processor to:
 identify a previous network issue;
 compare a first behavior of network components during said previous network issue with a second behavior of said network components during a current issue of a network;
 obtain a previous user input about a previous root cause of said previous network issue collected while diagnosing said previous network issue,
 assign a similarity score to said previous network issue relating to said current issue, the similarity score defined as a scalar value that represents the similarity between the current issue and previous network issue, the scalar value is a function of similarity S defined by:

$$S(A_1,A_2)=[s,f,w]$$

wherein $A_1$ and $A_2$ are anomalies,
wherein s is the similarity score,
wherein f is a network component mapping function, and
wherein w is a network component similarity strength between network issue components.

2. The computer program product of claim 1, further comprising computer readable program code to, when executed, cause the processor to rank said similarity score with other scores of a plurality of other previous network issues.

3. The computer program product of claim 2, further comprising computer readable program code to, when executed, cause the processor to determine a predicted current root cause based on said other scores and previous network issues.

4. The computer program product of claim 3, further comprising computer readable program code to, when executed, cause the processor to obtain a current user input about whether said predicted root cause is accurate.

5. The computer program product of claim 4, further comprising computer readable program code to, when executed, cause the processor to request said current user input.

6. The computer program product of claim 4, further comprising computer readable program code to, when executed, cause the processor to store said current user input in a database.

7. The computer program product of claim 4, further comprising computer readable program code to, when executed:
 receive user input that the root cause is inaccurate before the network issue is resolved;

determining a second root cause based on a next highest ranking of said ranked similarity scores and a recalculation of the previous network issues' similarity score with the current issue.

8. The computer program product of claim 2, further comprising computer readable program code to, when executed, remove a number of previous network issues associated with the ranked similarity scores for those ranked similarity scores that do not meet a similarity threshold with respect to the current issue.

9. The computer program product of claim 1, further comprising computer readable program code to, when executed, cause the processor to request said previous user input.

10. The computer program product of claim 1, further comprising computer readable program code to, when executed, cause the processor to obtain said previous user input from a database.

11. The computer program product of claim 1, in which the previous network issue is obtained from another network different from the network.

12. The computer program product of claim 1, further comprising computer readable program code to, when executed:
 determine a baseline score generated from behavior of the network components; and
 measuring the similarity score based on the baseline score.

13. A system for determining root causes of network issues, comprising:
 a processor and a memory, wherein said memory stores program instructions that when executed, cause said processor to:
 identify a number of previous network issues of a network;
 compare a first behavior of network components during said previous network issues with a second behavior of said network components during a current network issue to discover similarities between said previous network issues and said current network issue;
 obtain a previous user input about a previous root cause of said previous network issues;
 rank said previous network issues in a ranking of a plurality of other previous network issues;
 determine a predicted current root cause based on said ranking; and
 obtain a current user input about whether said predicted root cause is accurate.

14. The system of claim 13, wherein said processor is further programmed to request said previous user input from a database.

15. A method for determining root causes of network issues, comprising:
 comparing a first behavior of network components during a previous network issue with a second behavior of said network components during a current network issue;
 obtaining a previous user input about a previous root cause of said previous network issue;
 assigning a similarity score to said previous network issue in relation to said current network issue;
 determining a predicted current root cause based on said similarity score and previous network issue; and
 obtaining a current user input about whether said predicted root cause is accurate.

16. The method of claim 15, wherein obtaining said previous user input about said previous root cause of said previous network issue includes requesting said previous user input from a database that collected said previous user input while diagnosing said previous issue.

\* \* \* \* \*

UNITED STATES PATENT AND TRADEMARK OFFICE
CERTIFICATE OF CORRECTION

PATENT NO. : 9,071,510 B2  
APPLICATION NO. : 13/660878  
DATED : June 30, 2015  
INVENTOR(S) : Yonatan Ben Simhon et al.

Page 1 of 1

It is certified that error appears in the above-identified patent and that said Letters Patent is hereby corrected as shown below:

In The Claims

In column 11, line 39 approx., in Claim 1, delete "$A_l$" and insert -- $A_1$ --, therefor.

Signed and Sealed this
First Day of March, 2016

Michelle K. Lee
*Director of the United States Patent and Trademark Office*